(12) United States Patent
Yamada et al.

(10) Patent No.: US 7,154,763 B2
(45) Date of Patent: Dec. 26, 2006

(54) PUSH-PULL SWITCHING POWER CONVERTER

(75) Inventors: Yasuo Yamada, Hamamatsu (JP); Hiroshi Ogawa, Hamamatsu (JP)

(73) Assignee: Flying Mole Corporation, Hamamatsu (JP)

( * ) Notice: Subject to any disclaimer, the term of this patent is extended or adjusted under 35 U.S.C. 154(b) by 59 days.

(21) Appl. No.: 11/135,607

(22) Filed: May 24, 2005

(65) Prior Publication Data

US 2006/0023474 A1 Feb. 2, 2006

(30) Foreign Application Priority Data

Aug. 2, 2004 (JP) ............................. 2004-225330

(51) Int. Cl.
*H02M 3/335* (2006.01)
(52) U.S. Cl. ............................ 363/16; 363/97; 363/17; 363/132
(58) Field of Classification Search ............ 363/16–20, 363/97, 98, 84, 89, 131–134, 24–26, 127
See application file for complete search history.

(56) References Cited

U.S. PATENT DOCUMENTS 5,345,374 A * 9/1994 Sato et al. .................... 363/24
5,459,650 A * 10/1995 Noro ............................ 363/24
5,485,365 A * 1/1996 Dan-Harry .................. 363/132
5,657,212 A * 8/1997 Poon et al. .................... 363/17
6,208,530 B1* 3/2001 Hosotani ...................... 363/19

FOREIGN PATENT DOCUMENTS

JP        04-364362        12/1992

* cited by examiner

*Primary Examiner*—Rajnikant B. Patel
(74) *Attorney, Agent, or Firm*—Bacon & Thomas, PLLC

(57) ABSTRACT

A push-pull switching power converter includes, between high and low output terminals of a DC power source, a series circuit having a first switching device, a primary winding of a first transformer, a primary winding of a second transformer, and a second switching device in this order, and a series circuit composed of two capacitors, as well as a partial path for current resonance. The partial path connects middle points of the two series circuits. Voltage resonance causes the waveform of a switching voltage, which corresponds to the difference in voltages between high potential terminal of a primary of the first transformer and low potential terminal of a primary of the second transformer, to be a sine wave. Current resonance causes the waveform of a switching current, which corresponds to a combined current of primary winding currents of the first transformer and the second transformer, to be a sine wave.

5 Claims, 3 Drawing Sheets

PUSH-PULL SWITCHING POWER CONVERTER

CROSS-REFERENCE TO RELATED APPLICATION

This application claims, under 35 USC 119, priority of Japanese Application No. 2004-225330 filed Aug. 2, 2004.

BACKGROUND OF THE INVENTION

1. Field of the Invention

The present invention relates to a push-pull switching power converter and, in particular, to a power converter, such as an AC-to-DC converter and a DC-to-DC converter, using a pair of switching devices.

2. Description of the Related Art

Switching power supply circuits having a pair of switching devices and carrying out desired power conversion by switching on and off the switching devices control on and off of each switching device using a rectangular wave pulse (refer to, for example, Japanese Patent Application Laid-Open No. 4-364362).

Such switching power supply circuits also carry out dead-time control to prevent a through current flowing between the pair of switching devices and carry out timing control (zero cross control) to determine a timing for converting a logical level of the rectangular wave pulse by detecting the zero cross of voltage or current at a predetermined point.

In known switching power supply circuits, as described above, a dead-time control circuit and a zero-cross control circuit are essential, thus complicating the structure. Furthermore, since the signal wave used for switching is a rectangular pulse wave, switching noise tends to occur. Therefore, the power conversion efficiency is decreased, which is a problem.

SUMMARY OF THE INVENTION

The present invention has been accomplished in view of the above-mentioned problems, and it is an object of the present invention to provide a simple and compact push-pull switching power converter with low noise and a high power factor.

According to the present invention, a push-pull switching power converter includes (i) a first series circuit having a first switching device, a primary winding of a first transformer, a primary winding of a second transformer, and a second switching device in this order, the first series circuit being connected between a high and low output terminals of a DC source, (ii) a second series circuit having a first capacitor and a second capacitor, the second series circuit being connected between the high and low output terminals of the DC source, (iii) a third capacitor connected to the first switching device in parallel, (iv) a fourth capacitor connected to the second switching device in parallel, (v) a partial path for current resonance, the partial path connecting a middle point of the first series circuit to a middle point of the second series circuit, (vi) a first coil provided on an electric current path comprising half of the first series circuit at the high potential side, the partial path for current resonance, and half of the second series circuit at the low potential side, (vii) a second coil provided on an electric current path comprising half of the second series circuit at the high potential side, the partial path for current resonance, and half of the first series circuit at the low potential side, (viii) pulse generating means for generating a drive pulse to complementarily switch on and off the first switching device and the second switching device, and (ix) rectifying and smoothing means for converting AC power induced in the secondary winding of at least one of the first and second transformers to a DC current, wherein (x) switching voltage and switching current have the shape of a sine wave (xi) by causing current resonance with the first coil and the second capacitor during the time when the first switching device is on and causing current resonance with the second coil and the first capacitor during the time when the second switching device is on, and (xii) by causing voltage resonance with the third capacitor and the primary inductance of the first transformer during the time when the first switching device is off and causing voltage resonance with the fourth capacitor and the primary inductance of the second transformer during the time when the second switching device is off.

According to the present invention, the push-pull switching power converter has a switching voltage and switching current in the form of a sine wave. Thus, the high-frequency switching noise can be significantly reduced in principle. Also, by adapting a push-pull switching configuration, a simple and compact converter with high conversion efficiency, a high power factor, and a stable output can be achieved.

DESCRIPTION OF THE PREFERRED EMBODIMENTS

A. First Embodiment

A push-pull switching power converter according to a first embodiment of the present invention will be described below. According to the first embodiment, the push-pull switching power converter inputs a direct electric current and outputs a direct electric current; that is, the push-pull switching power converter is a DC-to-DC converter which converts a DC voltage to another DC voltage.

Figure 1:
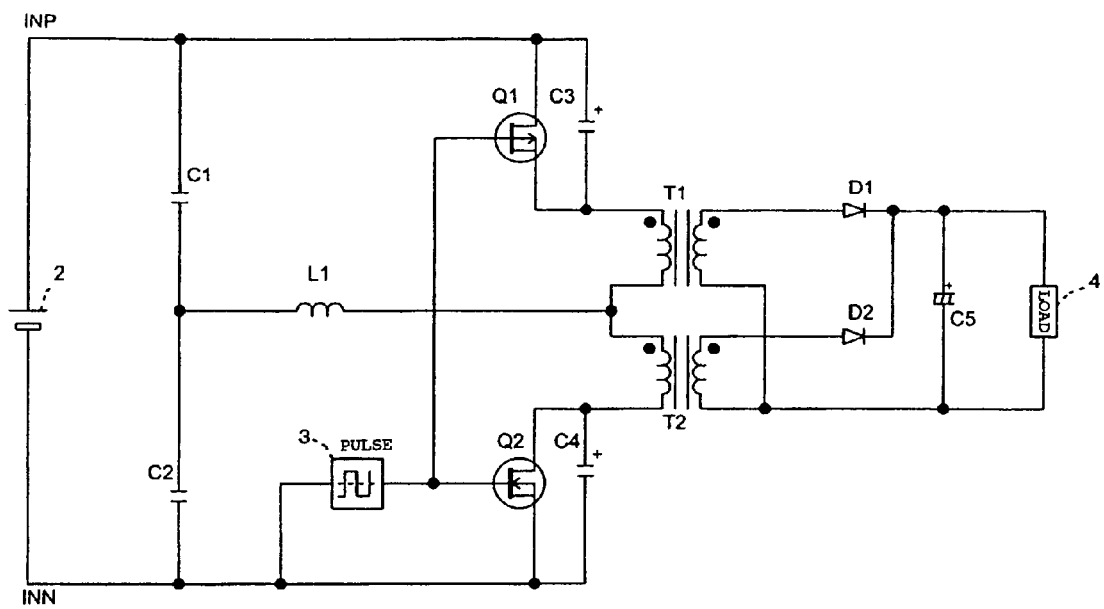
FIG. 1 is an overall circuit diagram of a power converter according to a first embodiment of the present invention.

FIG. 1 is an overall circuit diagram of the push-pull switching power converter according to the first embodiment. As shown in FIG. 1, a power converter (DC-to-DC converter) 1 according to the first embodiment includes a DC input source 2, a pulse generator 3, a load 4, switching devices Q1 and Q2, capacitors C1 to C5, transformers T1 and T2, and diodes D1 and D2.

The DC input source 2 may be a dry battery or a storage battery. Additionally, the DC input source 2 may be a component for converting a commercial power source to a DC power source. In the latter case, the power converter functions as an AC-to-DC converter. As shown in FIG. 1, the DC input source 2 has a high potential terminal INP and a low potential terminal INN, both of which are DC input terminals.

The switching device Q1, for example, is composed of a PMOS transistor, while the switching device Q2, for example, is composed of an NMOS transistor. Between the DC input terminals INP and INN, a source and a drain of the switching device Q1, a primary winding of the transformer T1, a primary winding of the transformer T2, and a source and a drain of the switching device Q2 are connected in series. In addition, between the DC input terminals INP and INN, the capacitors C1 and C2 are connected in series. Between the source and the drain of the switching device Q1, a capacitor C3 (including the internal capacitance of Q1) is connected in parallel, while, between the source and the drain of the switching device Q2, a capacitor C4 (including the internal capacitance of Q2) is connected in parallel. A connection point between the primary windings of the transformers T1 and T2 is connected to a connection point between the capacitors C1 and C2 via a coil L1.

The pulse generator 3 oscillates square pulses at a predetermined frequency (for example, 250 kHz) and with a duty ratio of 50%, although a detailed description of the internal structure of the pulse generator 3 is not included herein. The square pulses are applied to gates of both switching devices Q1 and Q2. If the switching device Q2 is a PMOS transistor like the switching device Q1, the pulse generator 3 may oscillate a pair of square pulses that complementarily vary and may supply each of the square pulses to the switching devices Q1 and Q2, separately.

The capacitors C1 and C2 are provided for resonating a current. The capacitors C1 and C2 are identical to each other.

The switching characteristic of the switching device Q1 is identical to that of the switching device Q2, although the switching devices Q1 and Q2 are a PMOS transistor and a NMOS transistor, respectively.

The capacitors C3 and C4 are provided for resonating voltage. The capacitors C3 and C4 have the same switching characteristic. The capacitors C3 and C4 may be discrete components so as to be incorporated in the circuit. Alternatively, the capacitors C3 and C4 may be circuit elements which are internal capacitances of the switching devices Q1 and Q2.

The transformers T1 and T2 have the same characteristic. The winding directions of the primary and secondary windings are determined such that the positive-to-negative direction of the voltage applied to the primary winding is the same as that of the induced voltage of the secondary winding (refer to polarity marks "●" of the transformers in FIG. 1). If a current flows through the primary windings of the transformers T1 and T2, the winding directions of the transformers T1 and T2 make the positive-to-negative directions of the voltage applied to the transformers T1 and T2 the same. The winding ratio of the primary winding with respect to the secondary winding may be freely determined for the transformers T1 and T2.

One end of the secondary winding of the transformer T1 is connected to an anode of the diode D1. The other end of the secondary winding of the transformer T1 is connected to a negative terminal of an electrolytic capacitor C5. One end of the secondary winding of the transformer T2 is connected to an anode of the diode D2. The other end of the secondary winding of the transformer T2 is connected to the negative terminal of the electrolytic capacitor C5. Cathodes of the two diodes D1 and D2 are connected to each other. A positive terminal of the capacitor C5 is connected to a connection point between the cathodes of the two diodes D1 and D2. The load 4 is connected in parallel to the capacitor C5.

According to the first embodiment, in the push-pull switching power converter (DC-to-DC converter) 1 having such a structure, a characteristic of each circuit element is determined such that, when the switching devices Q1 and Q2 are complementarily turned on and off with a rectangular pulse having a duty ratio of 50%, both the switching voltage and the switching current become sine waves.

Figure 2:
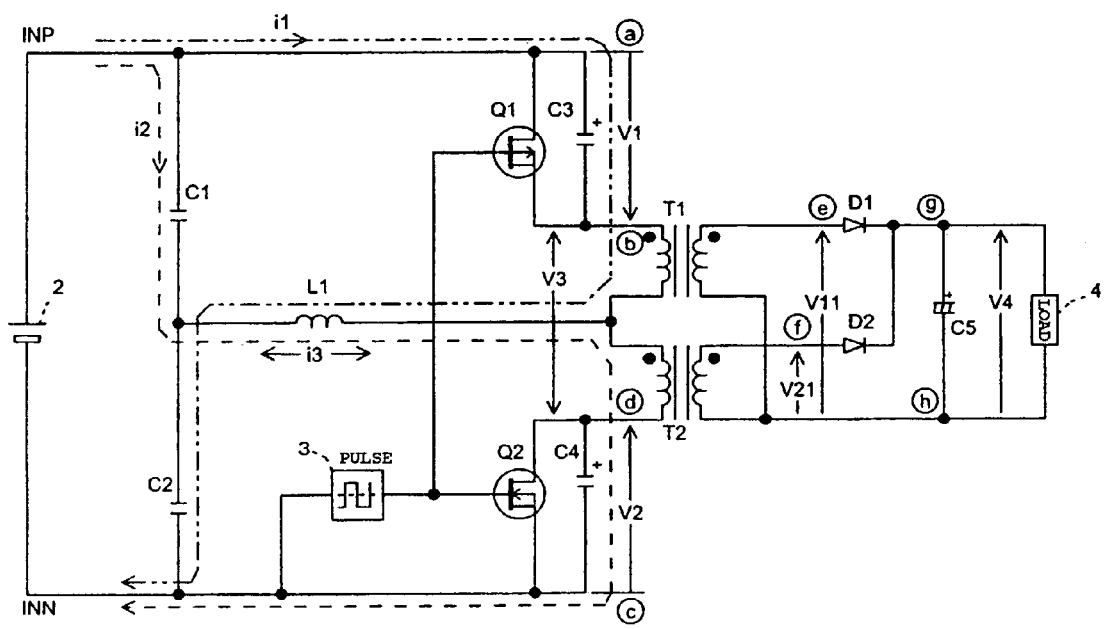
FIG. 2 is a diagram for explaining voltages and current paths in the first embodiment.

In the first embodiment, two current paths are provided for a current flowing out of the high-potential terminal INP of the DC input source 2 to return to the low-potential terminal INN of the DC input source 2. One is a first current path i1, which goes through the primary winding of the transformer T1, as shown by a chain double-dashed line in FIG. 2. The other is a second current path i2, which goes through the primary winding of the transformer T2, as shown by a dash line in FIG. 2. The first current path i1 is the following path: the high-potential terminal INP of the DC input source 2—the switching device Q1 (capacitor C3)—the primary winding of the transformer T1—the coil L1—the capacitor C2—the low-potential terminal INN of the DC input source 2. The second current path i2 is the following path: the high-potential terminal INP of the DC input source 2—the capacitor C1—the coil L1—the primary winding of the transformer T2—the switching device Q2 (capacitor C4)—the low-potential terminal INN of the DC input source 2. In the two current paths, the coil L1 is common. Accordingly, a current i3, which is a combined current of the first current i1 in the first current path and the second current i2 in the second current path, flows in the coil L1. Each of the currents i1, i2, and i3 is defined as positive when it flows in the coil L1 from the left to right in FIG. 2.

The operation of the push-pull switching power converter (DC-to-DC converter) 1 according to the first embodiment will be described next with reference to a signal wave diagram shown in FIG. 3. Herein, the potential of a connection point between the primary winding of the transformer T1 and the switching device Q1 (i.e., a point b in FIG. 2) is V1, and the potential of a connection point between the primary winding of the transformer T2 and the switching device Q2 (i.e., a point d in FIG. 2) is V2. The difference potential (voltage) between the two points is V3.

Figure 3:
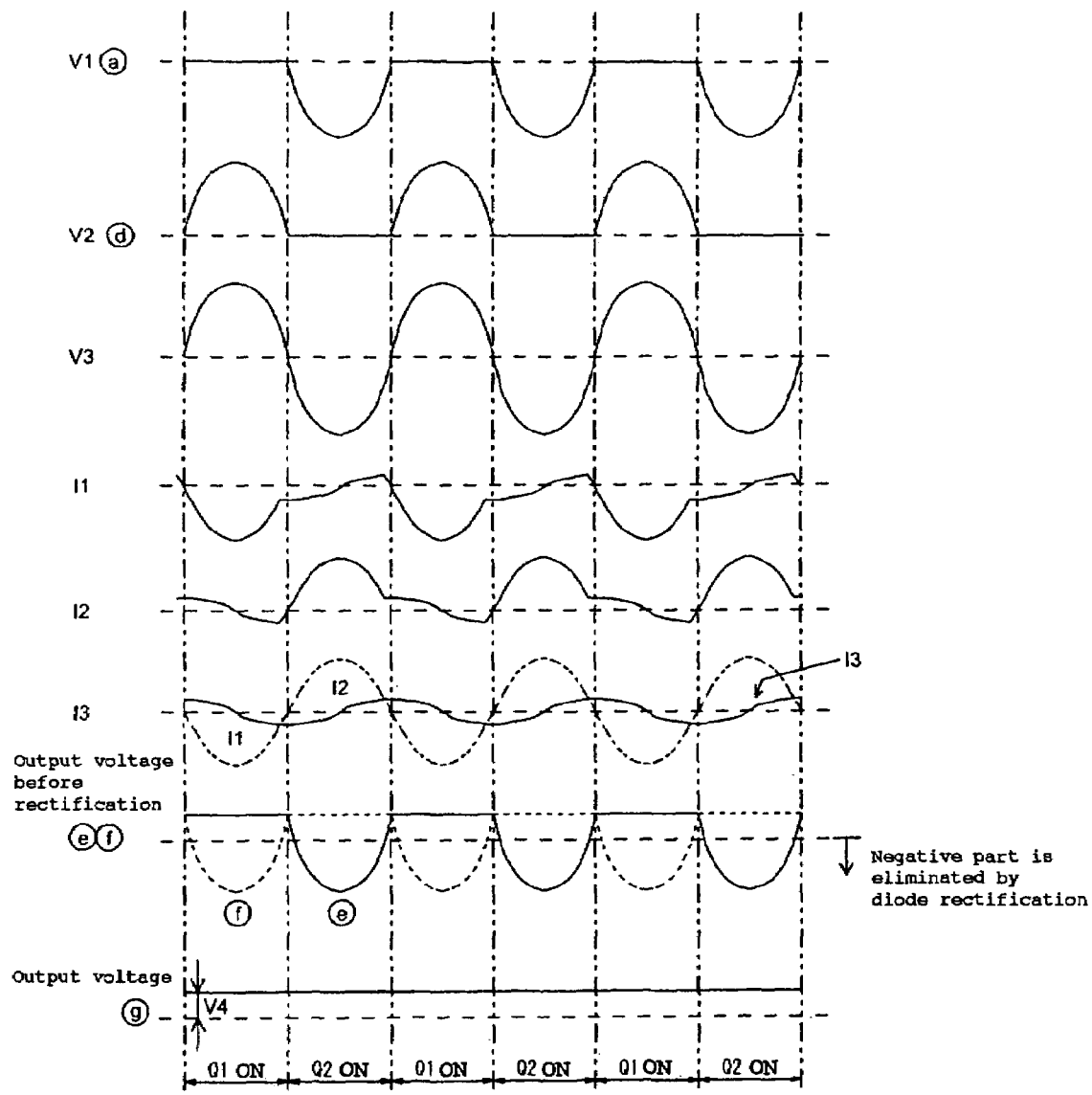
FIG. 3 shows waveforms of signals from components of the power converter according to the first embodiment.

As shown in FIG. 3, when a square pulse from the pulse generator 3 causes the switching device Q1 to be on and causes the switching device Q2 to be off, the potential V1 is fixed to the potential of the high-potential terminal INP (i.e., a point a in FIG. 2) of the DC input source 2 since the switching device Q1 is on. On the other hand, the potential V2 varies in a sine-wave pattern, as shown in FIG. 3, due to a voltage resonance function caused by a primary inductance of the transformer T2 and capacitance of the capacitor C4. As a result, a voltage V3 applied to a series circuit of the primary windings of two transformers T1 and T2 also varies in a sine-wave pattern in accordance with the variation in the potential V2. In FIG. 3, the voltage V3 corresponds to either potential V2 or V1, whichever primarily causes the variation in a sine-wave pattern.

When a square pulse from the pulse generator 3 causes the switching device Q1 to be off and causes the switching device Q2 to be on, the potential V2 is fixed to the potential of the low-potential terminal INN of the DC input source 2 (i.e., a point b in FIG. 2), as shown in FIG. 3, since the switching device Q2 is on. On the other hand, the potential V1 varies in a sine-wave pattern, as shown in FIG. 3, due to a voltage resonance function caused by primary inductance of the transformer T1 and capacitance of the capacitor C3. As a result, the voltage V3 applied to the series circuit of the primary windings of two transformers T1 and T2 also varies in a sine-wave pattern in accordance with the variation in the potential V1.

By repeating the complementary on-off control of the switching devices Q1 and Q2, the voltage V3 varies as a sine wave, as shown in FIG. 3.

Additionally, when a square pulse from the pulse generator 3 causes the switching device Q1 to turn on and causes the switching device Q2 to turn off, the electric current path changes to the above-described first path passing through the primary winding of the transformer T1. Accordingly, the current i1 flows due to energy from the DC input source 2. In the second path passing through the primary winding of the transformer T2, accumulation of energy in the coil L1 (and accumulation caused by leakage inductance of the primary winding of the transformer T1) is switched to discharge the energy. Accordingly, the current i2 starts flowing due to the discharge of the accumulated energy.

In contrast, when a square pulse from the pulse generator 3 causes the switching device Q1 to turn off and causes the switching device Q2 to turn on, the electric current path changes to the above-described second path passing through the primary winding of the transformer T2. Accordingly, the current i2 flows due to energy from the DC input source 2. In the first path passing through the primary winding of the transformer T1, accumulation of energy in the coil L1 (and accumulation caused by leakage inductance of the primary winding of the transformer T2) is switched to discharge the energy. Accordingly, the current i1 starts flowing due to the discharge of the accumulated energy.

Every time the primary current path switches, one of a pair of the coil L1 and the capacitor C2 and a pair of the coil L1 and the capacitor C1 provides an electric current resonance function so that the electric current i3 (=i1+i2) flowing the coil L1 varies as a sine wave, as shown in FIG. 3. That is, when the switching device Q1 is on, the coil L1 and the capacitor C2 cause resonance of the electric current i1. When the switching device Q2 is on, the coil L1 and the capacitor C1 cause resonance of the electric current i2. As a result, the electric current i3 varies as a sine wave.

As can be seen from FIG. 3, since the phase difference between the voltage V3 and the electric current i3 is nearly $\pi/2$, the power factor is about 1.

As described above, due to the variation in the voltage V3 in a sine wave pattern, electromotive voltages V11 and V21 having a sine wave pattern are induced across the secondary windings of the transformers T1 and T2, respectively. The induced voltage V11 of the transformer T1 is half-wave rectified by the diode D1 and, thus, the negative potential part of the voltage V11 is eliminated. Additionally, the induced voltage V21 of the transformer T2 is half-wave rectified by the diode D2 and, thus, the negative potential part of the voltage V21 is eliminated. As shown in FIG. 3, a voltage at a point g, where DC positive potential parts of both voltages V11 and V21 are combined by wiring, exhibits a waveform having no pulsating flow, just like a DC current component. Such a combined DC-like waveform is further smoothed by the capacitor C5, and a desired DC output voltage is supplied to the load 4. Therefore, the capacitor C5 can rectify an extremely small capacitance.

According to the first embodiment, the push-pull switching power converter (DC-to-DC converter) can provide the following advantages.

In the power converter according to the first embodiment, since both switching voltage and switching current have a sine wave pattern and such a sine-wave AC is converted by a power transformer, the high-frequency switching noise is significantly decreased compared to rectangular-wave switching voltage and switching current.

Additionally, since the primary side of the power transformer carries out a sine wave resonance, a voltage and a current in accordance with the number of turns are transmitted to the secondary side, thus decreasing noise at the secondary side.

Furthermore, since both switching voltage and switching current are sine waves, a dead-time control circuit and a zero-cross control circuit can be eliminated, thus simplifying the structure. Eliminating dead time increases the power factor and decreases the noise.

Still furthermore, since the power converter has a structure in which a voltage resonance function and a current resonance function occur, the power converter can efficiently convert the power. In addition, since push-pull switching provides a power factor much closer to 1, a peak value of the switching current can be decreased. Accordingly, the power efficiency can be further increased.

In addition, the push-pull switching uses two transformers. Accordingly, each transformer needs to provide only half the power, and therefore, the volume of each transformer can be decreased and the power converter can be miniaturized.

Also, the first embodiment provides an advantage in that the same principle can be applied from low power conversion to high power conversion.

B. Second Embodiment

Figure 4:
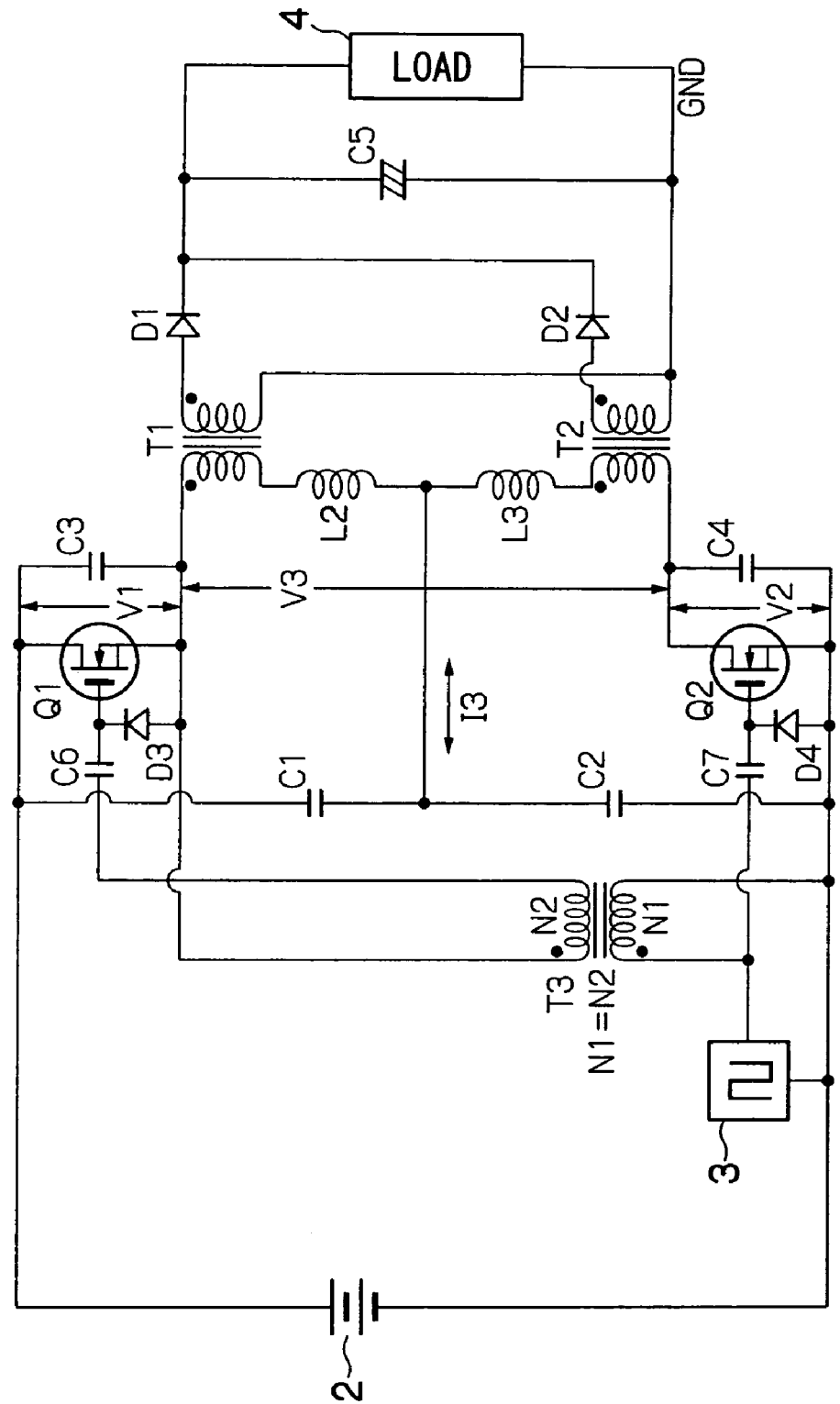
FIG. 4 is an overall circuit diagram of a power converter according to a second embodiment of the present invention.

A push-pull switching power converter according to a second embodiment of the present invention will be briefly described next with reference to FIG. 4 while focusing on the differences from the first embodiment.

A first difference is that, in the second embodiment, coils L2 and L3 respectively connected to the primary windings of transformers T1 and T2 in series are used for current resonance while the coil L1 provided in the path common to the first and second electric currents is used for current resonance in the first embodiment.

A second difference is that, in the second embodiment, a switching device Q1 at the high potential side is composed of an NMOS transistor, as with a switching device Q2 at low potential side. This allows switching devices Q1 and Q2 having the same characteristic to be easily obtained.

A third difference is that, in the second embodiment, since an NMOS transistor is used as the switching device Q1, an output of the pulse generator 3 is inverted and an insulating pulse transformer T3 for insulation is provided in order to reliably operate the switching device Q1.

A fourth difference is that, in the second embodiment, protection circuits, namely, a pair composed of D3 and C6 and a pair composed of D4 and C7, are provided for respectively protecting the switching devices Q1 and Q2 from a high voltage generated when switching on and off. The high-voltage protection circuit at the low potential side may be eliminated since it is provided only for maintaining symmetry with respect to that at the high potential side.

The second embodiment has the above-described differences from the first embodiment. However, the switching operation itself is the same as that in the first embodiment. That is, both current resonance and voltage resonance occur, and both switching voltage and switching current have a sine-wave waveform.

Additionally, the operations of the secondary windings of the transformers T1 and T2 are the same as those of the power converter (DC-to-DC converter) 1 in the first embodiment.

The power converter (DC-to-DC converter) in the second embodiment also provides the same advantage as in the first embodiment, since both switching voltage and switching current have a sine-wave waveform.

In the second embodiment, since NMOS transistors are used for both switching devices, the same characteristic is easily obtained, thus suppressing the variation in the characteristics of the products compared to the first embodiment.

C. Other Embodiments

The spirit of the present invention is not limited to the above-described embodiments. That is, possible modifications of the embodiments are listed below:

In the first and the second embodiments, an inductance component of the current resonance element is a coil. Alternatively, leakage inductance of the primaries of the transformers T1 and T2 may be used as the inductance component of the current resonance element.

Additionally, in the above-described embodiments, the switching devices Q1 and Q2 are composed of MOS transistors. However, the switching devices Q1 and Q2 may be composed of other types of unipolar transistors. In addition, the switching devices Q1 and Q2 may be composed of bipolar transistors. Furthermore, each of the switching devices Q1 and Q2 may be a plurality of transistors in Darlington connection. Still furthermore, the switching devices Q1 and Q2 may be composed of another type of switching device, such as a thyristor and an IGBT.

Additionally, in the above-described embodiments, the duty ratio of an on-and-off control signal supplied to the switching devices Q1 and Q2 is 50% and, therefore, the on-and-off control signal has no dead time. However, a dead time may be provided. Even if a dead time is provided, switching voltage and switching current have a near sine-wave waveform due to the resonance function. Even if the waveform is not an exact sine wave, loss does not occur due to a zero cross (note that the power factor is slightly deteriorated compared to the case of no dead time).

As described above, when an AC-to-DC conversion unit is used as a DC input source, the power converter acts as an AC-to-DC converter.

What is claimed is:

1. A push-pull switching power converter comprising:
    a first series circuit having a first switching device, a primary winding of a first transformer, a primary winding of a second transformer, and a second switching device in this order, the first series circuit being connected between high and low output terminals of a DC power source;
    a second series circuit having a first capacitor and a second capacitor, the second series circuit being connected between the high and low output terminals of the DC power source;
    a third capacitor connected in parallel to the first switching device;
    a fourth capacitor connected in parallel to the second switching device;
    a partial path for current resonance, the partial path connecting a middle point of the first series circuit to a middle point of the second series circuit;
    a first coil provided on an electric current path comprising half of the first series circuit at the high potential side, the partial path for current resonance, and half of the second series circuit at the low potential side;
    a second coil provided on an electric current path comprising half of the second series circuit at the high potential side, the partial path for current resonance, and half of the first series circuit at the low potential side;
    pulse generating means for generating a drive pulse to complementarily switch on and off the first switching device and the second switching device; and
    rectifying and smoothing means for converting AC power induced in a secondary winding of at least one of the first and second transformers to a DC current;
    wherein a switching voltage and switching current have the shape of a sine wave by causing current resonance with the first coil and the second capacitor during the time when the first switching device is on and causing current resonance with the second coil and the first capacitor during the time when the second switching device is on, and by causing voltage resonance with the third capacitor and the primary inductance of the first transformer during the time when the first switching device is off and causing voltage resonance with the fourth capacitor and the primary inductance of the second transformer during the time when the second switching device is off.

2. The push-pull switching power converter according to claim 1, wherein the first and second coils are a common coil provided on the partial path for current resonance.

3. The push-pull switching power converter according to claim 1, wherein the first coil is leakage inductance of the primary of the first transformer and the second coil is leakage inductance of the primary of the second transformer.

4. The push-pull switching power converter according to claim 1, wherein the first and second switching devices are composed of transistors, and the third and fourth capacitors are one of internal capacitances of the transistors and capacitors connected in parallel to the transistors.

5. The push-pull switching power converter according to claim 1, wherein the pulse generating means generates a drive pulse for fully complementarily switching on and off the first and second switching devices without the first and second switching devices being off at the same time.

* * * * *